(12) United States Patent
Tang

(10) Patent No.: US 11,229,048 B2
(45) Date of Patent: Jan. 18, 2022

(54) UPLINK CHANNEL TRANSMITTING METHOD, AND TERMINAL DEVICE

(71) Applicant: GUANGDONG OPPO MOBILE TELECOMMUNICATIONS CORP., LTD., Guangdong (CN)

(72) Inventor: Hai Tang, Guangdong (CN)

(73) Assignee: GUANGDONG OPPO MOBILE TELECOMMUNICATIONS CORP., LTD., Guangdong (CN)

( * ) Notice: Subject to any disclaimer, the term of this patent is extended or adjusted under 35 U.S.C. 154(b) by 76 days.

(21) Appl. No.: 16/733,458

(22) Filed: Jan. 3, 2020

(65) Prior Publication Data
US 2020/0146049 A1    May 7, 2020

Related U.S. Application Data

(63) Continuation of application No. PCT/CN2018/086606, filed on May 11, 2018.

(51) Int. Cl.
*H04W 72/14* (2009.01)
*H04L 1/18* (2006.01)
(Continued)

(52) U.S. Cl.
CPC ........... *H04W 72/14* (2013.01); *H04L 1/1819* (2013.01); *H04L 1/1896* (2013.01);
(Continued)

(58) Field of Classification Search
CPC ..... H04W 72/14; H04W 72/10; H04W 52/16; H04W 52/34; H04W 52/367;
(Continued)

(56) References Cited

U.S. PATENT DOCUMENTS

2013/0195048 A1    8/2013    Ekpenyong et al.
2017/0223695 A1*   8/2017    Kwak ............... H04W 56/0005
(Continued)

FOREIGN PATENT DOCUMENTS

CN    101594666 A    12/2009
CN    103200663 A    7/2013
(Continued)

OTHER PUBLICATIONS

U.S. Appl. No. 62/657,784,Specification,Apr. 14, 2018 (Year: 2018).*
(Continued)

*Primary Examiner* — Un C Cho
*Assistant Examiner* — Yu-Wen Chang

(57) ABSTRACT

The present application discloses an uplink channel transmitting method and a terminal device. The method includes: a terminal device receives uplink grant information transmitted by a network device, where the uplink grant information is used to indicate the terminal device to transmit a first uplink channel and a second uplink channel in a first time unit; and the terminal device transmits, according to priority of uplink channel, at least one of the first uplink channel and the second uplink channel in the first time unit in case that total transmitting power for the terminal device to transmit the first uplink channel and the second uplink channel exceeds maximum transmitting power for the terminal device; where the priority of uplink channel from low to high includes: an uplink channel without HARQ-ACK; and an uplink channel with HARQ-ACK.

14 Claims, 3 Drawing Sheets

(51) Int. Cl.
*H04L 5/00* (2006.01)
*H04L 5/10* (2006.01)
*H04W 72/10* (2009.01)

(52) U.S. Cl.
CPC .............. *H04L 5/0051* (2013.01); *H04L 5/10* (2013.01); *H04W 72/10* (2013.01)

(58) Field of Classification Search
CPC ............. H04W 52/281; H04W 52/146; H04W 72/1284; H04L 1/1819; H04L 1/1896; H04L 5/0051; H04L 5/10; H04L 5/0044; H04L 5/0055; H04L 1/1854; H04L 1/1812; H04L 1/1887; H04L 5/0064
See application file for complete search history.

(56) References Cited

U.S. PATENT DOCUMENTS

| | | | | |
|---|---|---|---|---|
| 2018/0242347 | A1* | 8/2018 | Sahlin | H04W 72/0446 |
| 2018/0279291 | A1* | 9/2018 | Tiirola | H04B 1/713 |
| 2019/0190663 | A1* | 6/2019 | Sahlin | H04L 1/0079 |
| 2019/0313436 | A1* | 10/2019 | Lee | H04W 72/1268 |
| 2019/0320396 | A1* | 10/2019 | Bagheri | H04W 52/346 |
| 2020/0037255 | A1* | 1/2020 | Liu | H04W 52/325 |
| 2020/0169958 | A1* | 5/2020 | Lee | H04W 52/38 |

FOREIGN PATENT DOCUMENTS

| | | |
|---|---|---|
| CN | 104812046 A | 7/2015 |
| CN | 106165504 A | 11/2016 |
| CN | 106465289 A | 2/2017 |
| CN | 106537997 A | 3/2017 |
| EP | 3637880 A1 | 4/2020 |
| WO | 2013067693 A1 | 5/2013 |

OTHER PUBLICATIONS

U.S. Appl. No. 62/669,975,Specification (Year: 2018).*
The Chinese First Office Action of corresponding Chinese application No. 201880003147.2, dated Feb. 27, 2020.
The EESR of corresponding European application No. 18917824.7, dated Jun. 12, 2020.
Ericsson et al:"Text proposal on power prioritization for slot/subslot operation in CA scenario", 3GPP Draft; R1-1803247-TP to 36213 Power Prioritization in CA, 3rd Generation Partnership Project (3GPP), Mobile Competence Centre; 650, Route Des Lucioles; F-06921 Sophia-Antipolis Cedex France, vol. RAN WG1, No. Athens, Greece; Feb. 26, 2018-Mar. 2, 2018 Feb. 22, 2018(Feb. 22, 2018), XP051398360.
Texas Instruments:"Outstanding aspects of UL power control for Dual Connectivity", 3GPP Draft; R1-144285 UL PC for DC, 3rd Generation Partnership Project (3GPP), Mobile Competence Centre; 650, Route Des Lucioles; F-06921 Sophia-Antipolis Cedex; France, vol. RAN WG1, No. Ljubliana, Slovennia; Oct. 6, 2014-Oct. 10, 2014 Oct. 5, 2014(Oct. 5, 2014), XP050875543.

* cited by examiner

UPLINK CHANNEL TRANSMITTING METHOD, AND TERMINAL DEVICE

CROSS-REFERENCE TO RELATED APPLICATIONS

This application is a continuation of International Application No. PCT/CN2018/086606 filed on May 11, 2018, the content of which is incorporated herein by reference in its entirety.

TECHNICAL FIELD

Embodiments of the present application relate to the field of communications and, in particular, to an uplink channel transmitting method, and a terminal device.

BACKGROUND

In the prior art, in order to reduce the delay of signal transmission, a time unit (or a transmission time interval) for signal transmission may be less than 14 symbols, that is, the transmission time interval for signal transmission is a short Transmission Time Interval (sTTI). The sTTI may be divided into a slot-TTI and a subslot-TTI according to a length of the time unit for transmission. A time length of the slot-TTI includes 7 symbols, while a time length of the subslot-TTI includes 2 symbols or 3 symbols. For the subslot-TTI, a position of a reference signal for demodulation of an uplink data channel in each subslot-TTI is indicated by uplink grant information. In order to reduce pilot overheads of the uplink data channel transmitted in the subslot-TTI, multiple subslot-TTIs are allowed to share reference signals on a same symbol. For a terminal device, different uplink channels may need to be transmitted in a same time unit. Therefore, when total transmitting power for transmission of the different uplink channels in the time unit exceeds maximum transmitting power for the terminal device, it has become an urgent problem to be solved with regard to how the terminal device performs uplink channel transmission.

SUMMARY

Embodiments of the present application provide an uplink channel transmitting method and a terminal device. When total transmitting power for transmission of different uplink channels in a time unit exceeds maximum transmitting power for a terminal device, it is still possible to achieve effective uplink channel transmission.

In a first aspect, an uplink channel transmitting method is provided. The method includes: receiving, by a terminal device, uplink grant information transmitted by a network device, where the uplink grant information is used to indicate the terminal device to transmit a first uplink channel and a second uplink channel in a first time unit; and transmitting, by the terminal device, according to priority of uplink channel, at least one of the first uplink channel and the second uplink channel in the first time unit in case that total transmitting power for the terminal device to transmit the first uplink channel and the second uplink channel exceeds maximum transmitting power for the terminal device; where the priority of uplink channel from low to high includes: an uplink channel without hybrid automatic repeat request-acknowledgement HARQ-ACK; and an uplink channel with HARQ-ACK.

Therefore, in the embodiments of the present application, when total transmitting power for transmission of different uplink channels in a time unit exceeds maximum transmitting power for a terminal device, the terminal device performs, based on priority of uplink channel, uplink channel transmission in the time unit. Since priority of uplink channel without HARQ-ACK is lower than priority of uplink channel with HARQ-ACK, thereby normal transmission of important HARQ-ACK is ensured to be prioritized.

In conjunction with the first aspect, in a possible implementation of the first aspect, the priority of uplink channel from low to high further includes: an uplink channel without HARQ-ACK and without a reference signal; an uplink channel without HARQ-ACK and with a reference signal; an uplink channel with HARQ-ACK and without a reference signal; and an uplink channel with HARQ-ACK and with a reference signal.

In conjunction with the first aspect or any possible implementation described above, in another possible implementation of the first aspect, the priority of uplink channel from low to high further includes: an uplink channel without HARQ-ACK and without the reference signal; an uplink channel without HARQ-ACK and with the reference signal and not sharing the reference signal, where the reference signal in the uplink channel not sharing the reference signal is not used to demodulate an uplink channel in a second time unit, and the uplink channel in the second time unit comprises HARQ-ACK and does not comprise the reference signal; an uplink channel with HARQ-ACK and without the reference signal; an uplink channel without HARQ-ACK and with the reference signal and sharing the reference signal, where the reference signal in the uplink channel sharing the reference signal is used to demodulate the uplink channel in the second time unit; and an uplink channel with HARQ-ACK and with the reference signal.

Therefore, in this embodiment, even if an uplink channel transmitted in a first time unit does not include HARQ-ACK, since a reference signal is carried in the uplink channel and the reference signal is used to demodulate HARQ-ACK that has been transmitted in a second time unit, therefore, according to priority of uplink channel, the priority of uplink channel sharing the reference signal that is transmitted in the first time unit is only lower than an uplink channel with HARQ-ACK and with a reference signal, thereby ensuring at least normal transmission of one HARQ-ACK.

In conjunction with the first aspect or any possible implementation described above, in another possible implementation of the first aspect, the second time unit is one previous time unit adjacent to the first time unit.

Certainly, the second time unit may also be one next time unit adjacent to the first time unit.

In conjunction with the first aspect or any possible implementation described above, in another possible implementation of the first aspect, the uplink grant information is used to indicate the terminal device to transmit a first uplink channel and a second uplink channel in a first time unit, including: the uplink grant information is used to indicate the terminal device to transmit the first uplink channel in a first time unit on a first carrier and transmits the second uplink channel in a first time unit on a second carrier, where the first carrier is a carrier in a primary physical uplink control channel PUCCH group configured for the terminal device, and the second carrier is a carrier in a secondary PUCCH group configured for the terminal device.

The priority of uplink channel from low to high further includes: an uplink channel without HARQ-ACK on the second carrier; an uplink channel without HARQ-ACK on the first carrier; an uplink channel with HARQ-ACK on the second carrier; and an uplink channel with HARQ-ACK on the first carrier.

In conjunction with the first aspect or any possible implementation described above, in another possible implementation of the first aspect, the priority of uplink channel from low to high further includes: an uplink channel without HARQ-ACK and without a reference signal on the second carrier; an uplink channel without HARQ-ACK and without a reference signal on the first carrier; an uplink channel without HARQ-ACK and with a reference signal on the second carrier; an uplink channel without HARQ-ACK and with a reference signal on the first carrier; an uplink channel with HARQ-ACK and without a reference signal on the second carrier; an uplink channel with HARQ-ACK and without a reference signal on the first carrier; an uplink channel with HARQ-ACK and with a reference signal on the second carrier; and an uplink channel with HARQ-ACK and with a reference signal on the first carrier.

In conjunction with the first aspect or any possible implementation described above, in another possible implementation of the first aspect, the priority of uplink channel from low to high further includes: the uplink channel without HARQ-ACK and without the reference signal on the second carrier; the uplink channel without HARQ-ACK and without the reference signal on the first carrier; an uplink channel without HARQ-ACK and with the reference signal and not sharing the reference signal on the second carrier, where the reference signal in the uplink channel not sharing the reference signal is not used to demodulate an uplink channel in the second time unit, and the uplink channel in the second time unit comprises HARQ-ACK and does not comprise the reference signal; an uplink channel without HARQ-ACK and with the reference signal and not sharing the reference signal on the first carrier; the uplink channel with HARQ-ACK and without the reference signal on the second carrier; the uplink channel with HARQ-ACK and without the reference signal on the first carrier; an uplink channel without HARQ-ACK and with the reference signal and sharing the reference signal on the second carrier, where the reference signal in the uplink channel sharing the reference signal is used to demodulate the uplink channel in the second time unit; an uplink channel without HARQ-ACK and with the reference signal and sharing the reference signal on the first carrier; the uplink channel with HARQ-ACK and with the reference signal on the second carrier; and the uplink channel with HARQ-ACK and with the reference signal on the first carrier.

In conjunction with the first aspect or any possible implementation described above, in another possible implementation of the first aspect, the priority of uplink channel from low to high further includes: the uplink channel without HARQ-ACK and without the reference signal on the second carrier; the uplink channel without HARQ-ACK and without the reference signal on the first carrier; an uplink channel without HARQ-ACK and with the reference signal and not sharing the reference signal on the second carrier, where the reference signal in the uplink channel not sharing the reference signal is not used to demodulate an uplink channel in the second time unit, and the uplink channel in the second time unit comprises HARQ-ACK and does not comprise the reference signal; the uplink channel with HARQ-ACK and without the reference signal on the second carrier; the uplink channel with HARQ-ACK and without the reference signal on the first carrier; an uplink channel without HARQ-ACK and with the reference signal and not sharing the reference signal on the first carrier; an uplink channel without HARQ-ACK and with the reference signal and sharing the reference signal on the second carrier, where the reference signal in the uplink channel sharing the reference signal is used to demodulate the uplink channel in the second time unit; the uplink channel with HARQ-ACK and with the reference signal on the second carrier; an uplink channel without HARQ-ACK and with the reference signal and sharing the reference signal on the first carrier; and the uplink channel with HARQ-ACK and with the reference signal on the first carrier.

In conjunction with the first aspect or any possible implementation described above, in another possible implementation of the first aspect, the priority of uplink channel from low to high further includes: the uplink channel without HARQ-ACK and without the reference signal on the second carrier; the uplink channel without HARQ-ACK and without the reference signal on the first carrier; an uplink channel without HARQ-ACK and with the reference signal and not sharing the reference signal on the second carrier, where the reference signal in the uplink channel not sharing the reference signal is not used to demodulate an uplink channel in the second time unit, and the uplink channel in the second time unit comprises HARQ-ACK and does not comprise the reference signal; an uplink channel without HARQ-ACK and with the reference signal and not sharing the reference signal on the first carrier; the uplink channel with HARQ-ACK and without the reference signal on the second carrier; an uplink channel without HARQ-ACK and with the reference signal and sharing the reference signal on the second carrier, where the reference signal in the uplink channel sharing the reference signal is used to demodulate the uplink channel in the second time unit; the uplink channel with HARQ-ACK and with the reference signal on the second carrier; the uplink channel with HARQ-ACK and without the reference signal on the first carrier; an uplink channel without HARQ-ACK and with the reference signal and sharing the reference signal on the first carrier; and the uplink channel with HARQ-ACK and with the reference signal on the first carrier.

In conjunction with the first aspect or any possible implementation described above, in another possible implementation of the first aspect, the second time unit is one previous time unit adjacent to the first time unit.

In conjunction with the first aspect or any possible implementation described above, in another possible implementation of the first aspect, the transmitting, by the terminal device, according to priority of uplink channel, at least one of the first uplink channel and the second uplink channel in the first time unit includes: transmitting, by the terminal device, according to the priority of uplink channel, one of the first uplink channel and the second uplink channel with higher priority in the first time unit.

In conjunction with the first aspect or any possible implementation described above, in another possible implementation of the first aspect, the transmitting, by the terminal device, according to priority of uplink channel, at least one of the first uplink channel and the second uplink channel in the first time unit includes: transmitting, by the terminal device, one of the first uplink channel and the second uplink channel with higher priority in the first time unit, and reducing transmitting power to transmit one of the first uplink channel and the second uplink channel with lower priority.

In a second aspect, a terminal device is provided. The terminal device can perform the method in the first aspect described above or any optional implementation of the first aspect. In particular, the terminal device may include a functional module for performing the method in the first aspect described above or any possible implementation of the first aspect.

In a third aspect, a terminal device is provided, including: a processor and a memory. The memory is configured to store a computer program, and the processor is configured to call and run the computer program stored in the memory such that the method in the first aspect described above or any possible implementation of the first aspect is performed.

In a fourth aspect, a chip is provided, for implementing the method in the first aspect described above or any possible implementation of the first aspect. In particular, the chip includes a processor which is configured to call and run a computer program from a memory such that a device on which the chip is mounted performs the method in the first aspect described above or any possible implementation of the first aspect.

In a fifth aspect, a computer readable storage medium is provided, for storing a computer program which causes a computer to perform the method in the first aspect described above or any possible implementation of the first aspect.

In a sixth aspect, a computer program product is provided, including a computer program instruction which causes a computer to perform the method in the first aspect described above or any possible implementation of the first aspect.

In a seventh aspect, a computer program is provided, which when running on a computer, causes the computer to perform the method in the first aspect described above or any possible implementation of the first aspect.

BRIEF DESCRIPTION OF DRAWING(S)

DESCRIPTION OF EMBODIMENTS

The technical solutions in the embodiments of the present application can be applied to various communication systems, such as a Global System of Mobile communication (GSM), a Code Division Multiple Access (CDMA) system, a Wideband Code Division Multiple Access (WCDMA) system, a General Packet Radio Service (GPRS), a Long Term Evolution (LTE) system, an LTE Frequency Division Duplex (FDD) system, an LTE Time Division Duplex (TDD) system, an Advanced long term evolution (LTE-A) system, a New Radio (NR) system, an evolutional system of the NR system, an LTE-based access to unlicensed spectrum (LTE-U) system, an NR-based access to unlicensed spectrum (NR-U) system, a Universal Mobile Telecommunication System (UMTS), a Worldwide Interoperability for Microwave Access (WiMAX) communication system, a Wireless Local Area Network (WLAN), Wireless Fidelity (WiFi), a next generation communication system, or other communication systems, and the like.

In general, traditional communication systems support a limited number of connections and are also easy to implement. However, with development of the communication technologies, mobile communication systems will not only support traditional communications, but also support, for example, Device to Device (D2D) communication, Machine to Machine (M2M) communication, Machine Type Communication (MTC), and Vehicle to Vehicle (V2V) communication, etc., and embodiments of the present application can also be applied to these communication systems.

In an embodiment, the communication systems in the embodiments of the present application may be applied to a Carrier Aggregation (CA) scenario, or a Dual Connectivity (DC) scenario, or a Standalone (SA) network-distributing scenario.

The applied spectrum is not limited in the embodiments of the present application. For example, the embodiments of the present application can be applied to a licensed spectrum, or a license-free spectrum.

Figure 1:
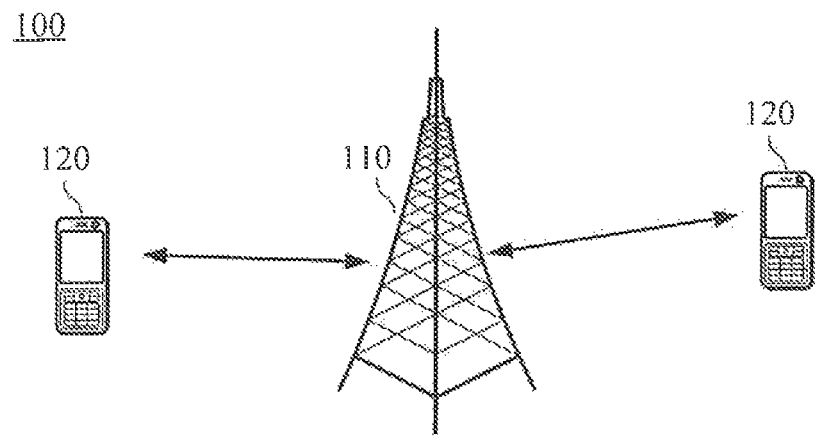
FIG. 1 is a schematic diagram of a possible wireless communication system applied in an embodiment of the present application.

FIG. 1 shows a possible wireless communication system 100 applied in an embodiment of the present application. The wireless communication system 100 may include a network device 110. The network device 110 may be a device that communicates with a terminal device. The network device 110 may provide a particular geographic area with communication coverage and may communicate with a terminal device located within the coverage. In an embodiment, the network device 110 may be a base station (Base Transceiver Station, BTS) in the GSM system or the CDMA system, or a base station (NodeB, NB) in the WCDMA system, or an evolved base station (Evolutional Node B, eNB or eNodeB) in the LTE system, or a network side device in the NR system, or a wireless controller in a Cloud Radio Access Network (CRAN), alternatively, the network device may be a relay station, an access point, a vehicle-mounted device, a wearable device, a network side device in the next generation network or a network device in a future evolutional Public Land Mobile Network (PLMN), and the like.

The wireless communication system 100 also includes at least one terminal 120 located within the coverage of the network device 110. The terminal device 120 may be mobile or stationary. The terminal device 120 may refer to an access terminal, User Equipment (UE), a subscriber unit, a subscriber station, a mobile station, a mobile platform, a remote station, a remote terminal, a mobile device, a user terminal, a terminal, a wireless communication device, a user agent, or a user apparatus. The access terminal may be a cellular phone, a cordless phone, a Session Initiation Protocol (SIP) phone, a Wireless Local Loop (WLL) station, a Personal Digital Assistant (PDA), a handheld device with wireless communication functions, a computing device or other processing device connected to a wireless modem, a vehicle-mounted device, a wearable device, a terminal device in the future 5G network, or a terminal device in the future evolutional PLMN, and the like. In an embodiment, Device to Device (D2D) communications may be performed between terminal devices 120.

The network device 110 may provide a service to a cell, and the terminal device 120 communicates with the network device 110 via a transmission resource (such as a frequency domain resource, or a spectrum resource) used by the cell. The cell may be a cell corresponding to the network device 110 (such as a base station). The cell may belong to a macro base station, or a base station corresponding to a Small cell, where the Small cell herein may include: a Metro cell, a Micro cell, a Pico cell, a Femto cell, etc. These small cells have characteristics such as small coverage and low transmitting power, which are suitable for providing high-speed data transmission services.

FIG. 1 exemplarily shows one network device and two terminal devices. In an embodiment, the wireless communication system 100 may include multiple network devices and other numbers of terminal devices may be included within the coverage of each of the network devices, this is not limited in the embodiment of the present application.

In an embodiment, the wireless communication system 100 may further include other network entities, such as a network controller, a mobility management entity and the like; this is not limited in the embodiment of the present application.

It should be understood that the uplink channel may include a Physical Random Access Channel (PRACH), a Physical Uplink Control Channel (PUCCH), a Physical Uplink Shared Channel (PUSCH), and the like. The uplink reference signal may include an uplink DeModulation Reference Signal (DMRS), a Sounding Reference Signal (SRS), a Phase Tracking Reference Signal (PT-RS), and the like. The uplink DMRS can be used for uplink channel demodulation; the SRS can be used for uplink channel measurement; uplink time-frequency synchronization or phase tracking, or the PT-RS can also be used for uplink channel measurement, uplink time-frequency synchronization or phase tracking.

It should be understood that the uplink channel may also include a physical channel or a reference signal with the same name and without the same function, or may include a physical channel or a reference signal without the same name and with the same function.

It should be understood that the transmission object in the embodiment of the present application may be an uplink channel and may be a PUSCH and/or a PUCCH. After the sTTI transmission technology is introduced, the scheduling unit for scheduling signal transmission in the radio link may be a subframe-TTI (for example, a length of TTI is 14 symbols), a slot-TTI (for example, a length of TTI is 7 symbols), or a subslot-TTI (for example, a length of TTI is 2 symbols or 3 symbols). That is, the PUSCH and/or PUCCH may be transmitted in the subframe-TTI, or transmitted in the slot-TTI, or transmitted in the subslot-TTI.

Figure 2A:
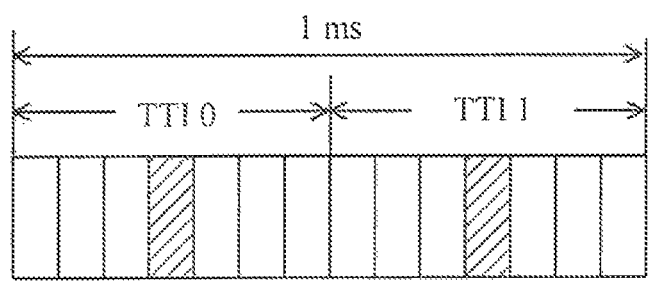
FIG. 2(a) is a schematic diagram of a slot-TTI.

By way of example rather than limitation, FIG. 2(a) shows a structure of a slot-TTI with 14 symbols included in 1 millisecond, where 7 preceding symbols form one slot-TTI, and 7 posterior symbols form one slot-TTI. For each slot-TTI, a reference signal is located at the 4$^{th}$ symbol of a slot.

Figure 2B:
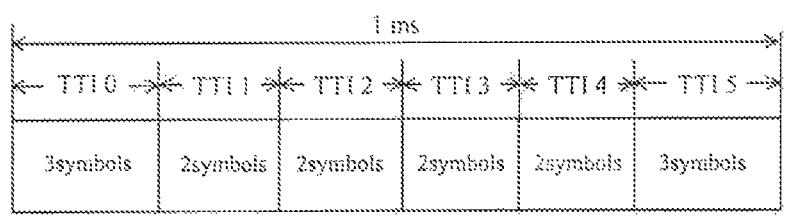
FIG. 2(b) is a schematic diagram of a subslot-TTI.

By way of example rather than limitation, FIG. 2(b) shows a structure of a subslot-TTI, and 14 symbols included in 1 millisecond are divided into 6 subslot-TTIs, where each of the first and last subslot-TTIs includes 3 symbols, and each of the remaining 4 subslot-TTIs includes 2 symbols. In the subslot-TTI structure, a position of a reference signal for demodulation of an uplink channel in each subslot-TTI may be indicated by dynamic signaling, such as uplink grant information.

Table 1 gives an example of dynamically indicating a demodulation reference signal position in a subslot-TTI. As shown in Table 1, D denotes a symbol for transmission of uplink data, R denotes a symbol for transmission of a reference signal, and the terminal device transmits an uplink data symbol and a reference signal symbol according to dynamic signaling indication transmitted by the network device. STTI 0 includes 3 symbols, and a reference signal for PUSCH demodulation in sTTI 0 may be located at the first symbol or the last symbol in sTTI 0; sTTI 1 includes 2 symbols, and a reference signal for PUSCH demodulation in sTTI 1 may be located at the first symbol or the last symbol in sTTI 1 or may not be located in sTTI 1, for example, when dynamic signaling indicates that "DD" is transmitted in sTTI 1, the reference signal for the PUSCH demodulation in sTTI 1 may be located in sTTI 0, when dynamic signaling indicates that "DD|R" is transmitted in sTTI 1, the reference signal for the PUSCH demodulation in sTTI 1 is located at the first symbol in sTTI 2; sTTI 2 includes 2 symbols, and a reference signal for PUSCH demodulation in sTTI 2 may be located at the first symbol in sTTI 2 or may not be located in sTTI 2, for example, when dynamic signaling indicates that "DD" is transmitted in sTTI 2, the reference signal for the PUSCH demodulation in sTTI 2 may be located in sTTI 0 or sTTI 1; sTTI 3 includes 2 symbols, and a reference signal for PUSCH demodulation in sTTI 3 may be located at the first symbol or the last symbol in sTTI 3 or may be located at the first symbol in sTTI 4; sTTI 4 includes 2 symbols, and a reference signal for PUSCH demodulation in sTTI 4 may be located at the first symbol or the last symbol in sTTI 4 or may not be located in sTTI 4, for example, when dynamic signaling indicates that "DD" is transmitted in sTTI 4, the reference signal for the PUSCH demodulation in sTTI 4 may be located in sTTI 3, when dynamic signaling indicates that "DD|R" is transmitted in sTTI 4, the reference signal for the PUSCH demodulation in sTTI 4 is located at the first symbol in sTTI 5; sTTI 5 includes 3 symbols, and a reference signal for PUSCH demodulation in sTTI 5 may be located at the first symbol in sTTI 5.

TABLE 1

| Reference signal position | | | | | |
|---|---|---|---|---|---|
| sTTI 0 | sTTI 1 | sTTI 2 | sTTI 3 | sTTI 4 | sTTI 5 |
| RDD | RD | RD | RD | RD | RDD |
| DDR | DR | DD | DR | DR | |
| | DD | | DD|R | DD | |
| | DD|R | | | DD|R | |

It should be noted that a data symbol included in the PUSCH may carry Uplink Control Information (UCI) or may not carry UCI. The UCI carried in the PUSCH may include at least one of HARQ-ACK and Channel State Information (CSI), where the CSI includes at least one of a Rank Indication (RI), a Precoding Matrix Indicator (PMI), a Channel Quality Indicator (CQI).

By dynamically indicating a reference signal in a subslot-TTI, multiple (e.g., two or three) subslot-TTIs may be allowed to share the reference signal, thereby reducing overheads of the reference signal during uplink transmission.

For example, as shown in Table 2, on the carrier in the primary PUCCH group, the terminal device is scheduled to transmit "DR" and "DD" in sTTI n and sTTI n+1, respectively, where an uplink channel in sTTI n+1 includes HARQ-ACK information, and a reference signal in sTTI n may be used to demodulate the uplink channel carrying HARQ-ACK in sTTI n+1; on the carrier in the secondary PUCCH group, the terminal device is indicated by dynamic signaling to transmit "DD|R" and "RD" in sTTI n and sTTI n+1, respectively, where an uplink channel in sTTI n includes HARQ-ACK information, and a reference signal in sTTI n+1 may be used to demodulate the uplink channel carrying HARQ-ACK in sTTI n.

TABLE 2

| PUCCH group | sTTI n | sTTI n + 1 |
|---|---|---|
| One carrier in a primary PUCCH group | DR | DD with HARQ-ACK |
| One carrier in a secondary PUCCH group | DD with HARQ-ACK | RD |

For another example, as shown in Table 3, on the carrier in the primary PUCCH group, the terminal device is indicated by dynamic signaling to transmit "DD|R" and "RD" in sTTI n and sTTI n+1, respectively, and a reference signal in sTTI n+1 may be used to demodulate the uplink channel carrying HARQ-ACK in sTTI n; on the carrier in the secondary PUCCH group, a reference signal in sTTI n may be used to demodulate the uplink channel carrying HARQ-ACK in sTTI n+1.

TABLE 3

| PUCCH group | sTTI n | sTTI n + 1 |
|---|---|---|
| One carrier in a primary PUCCH group | DD with HARQ-ACK | RD |
| One carrier in a secondary PUCCH group | DR | DD with HARQ-ACK |

For another example, as shown in Table 4, on the carrier in the secondary PUCCH group, a reference signal in sTTI n may be used to demodulate the uplink channel carrying HARQ-ACK in sTTI n+2.

TABLE 4

| PUCCH group | sTTI n | sTTI n + 1 | sTTI n + 2 |
|---|---|---|---|
| One carrier in a primary PUCCH group | DDR | DD | RD |
| One carrier in a secondary PUCCH group | DDR | DD | DD with HARQ-ACK |

For another example, as shown in Table 5, on the carrier in the secondary PUCCH group, a reference signal in sTTI n may be used to demodulate the uplink channel carrying HARQ-ACK in sTTI n+1 or sTTI n+2.

TABLE 5

| PUCCH group | sTTI n | sTTI n + 1 | sTTI n + 2 |
|---|---|---|---|
| One carrier in a primary PUCCH group | DDR | DD | RD |
| One carrier in a secondary PUCCH group | DDR | DD with HARQ-ACK | DD with HARQ-ACK |

Taking Table 2 as an example, in sTTI n and sTTI n+1, the terminal device should transmit "DR" and "DD with HARQ-ACK" on one carrier in the primary PUCCH group respectively, and transmit "DD with HARQ-ACK" and "RD" on one carrier in the secondary PUCCH group respectively. When the terminal device is limited in transmitting power, for example, when the total transmitting power for the terminal device to transmit "DR" and "DD with HARQ-ACK" in sTTI n exceeds the maximum transmitting power for the terminal device, in case that the terminal device transmits, in sTTI n, "DD with HARQ-ACK" in the secondary PUCCH group but drops "DR" in the primary PUCCH group, and transmits, in sTTI n+1, "DD with HARQ-ACK" in the primary PUCCH group but drops "RD" in the secondary PUCCH group, then there will be no corresponding reference signal to demodulate "DD with HARQ-ACK" in the primary PUCCH group and the secondary PUCCH group.

Where "with HARQ-ACK" indicates that an uplink channel in the sTTI carries HARQ-ACK. In case that there is no "with HARQ-ACK", it indicates that an uplink channel in the sTTI does not carry HARQ-ACK.

Therefore, as proposed in the embodiment of the present application, when total transmitting power for transmission of different uplink channels in a time unit exceeds maximum transmitting power for a terminal device, the terminal device performs, based on priority of uplink channel, uplink channel transmission in the time unit.

Figure 3:
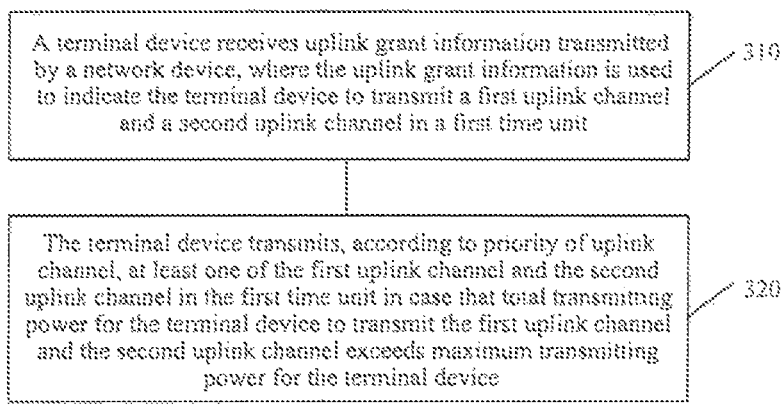
FIG. 3 is a schematic flowchart of an uplink channel transmitting method according to an embodiment of the present application.

FIG. 3 is a schematic flowchart of an uplink channel transmitting method 300 according to an embodiment of the present application. The method described in FIG. 3 may be performed by a terminal device which can be, for example, the terminal device 120 shown in FIG. 1. As shown in FIG. 3, the uplink channel transmitting method 300 may include some or all of the following steps.

In 310, a terminal device receives uplink grant information transmitted by a network device, where the uplink grant information is used to indicate the terminal device to transmit a first uplink channel and a second uplink channel in a first time unit.

It should be understood that the uplink grant information may be one uplink grant information or multiple uplink grant information. The terminal device may receive one or multiple uplink grant information, where one uplink grant information may schedule one uplink channel or may schedule multiple uplink channels. This is not limited in the present application.

In the embodiment of the present application, with reference to Table 1, a PUSCH transmitted in a subslot-TTI may include the following three cases:

Case 1: a data symbol and a reference signal symbol are included in the PUSCH, for example, when the terminal device is scheduled to transmit "RDD", "DDR", "RD", or "DR".

Case 2: a data symbol is included in the PUSCH instead of a reference signal symbol, for example, when the terminal device is scheduled to transmit "DD"; or when the terminal device is scheduled to transmit "DD|R" in sTTI n, the terminal device should transmit "DD" in sTTI n and transmit "R" in sTTI n+1, where transmission in sTTI n belongs to this case.

Case 3: a reference signal symbol is included in the PUSCH instead of a data symbol, for example, when the terminal device is scheduled to transmit "DD|R" in sTTI n, the terminal device should transmit "DD" in sTTI n and transmit "R" in sTTI n+1, where transmission in sTTI n+1 belongs to this case.

It should be noted that in case that the terminal device is scheduled to transmit "DD|R" in sTTI n and scheduled to transmit "RD" in sTTI n+1, plus a frequency resource occupied on an uplink channel in sTTI n+1 includes a frequency resource occupied on an uplink channel in sTTI n, then the terminal device should transmit "DD" in sTTI n and transmit "RD" in sTTI n+1. In this situation, transmission in sTTI n+1 belongs to the first case described above.

In 320, the terminal device transmits, according to priority of uplink channel, at least one of the first uplink channel and the second uplink channel in the first time unit in case that total transmitting power for the terminal device to transmit the first uplink channel and the second uplink channel exceeds maximum transmitting power for the terminal device.

In an embodiment, a length of the first time unit may be 2 symbols or 3 symbols, for example, the first time unit may be the aforementioned sTTI of 2 symbols or 3 symbols. The first time unit may also be in other lengths, which is not limited in this application.

The priority of uplink channel from low to high includes:
an uplink channel without uplink control information UCI; and
an uplink channel with UCI.

Therefore, when total transmitting power for transmission of different uplink channels in a time unit exceeds maximum transmitting power for a terminal device, the terminal device performs, based on priority of uplink channel, uplink channel transmission in the time unit. Since priority of uplink channel without UCI is lower than priority of uplink channel with UCI, thereby normal transmission of important UCI is ensured to be prioritized.

In an embodiment, the UCI includes at least one of Hybrid Automatic Repeat request-Acknowledgement (HARQ-ACK) information, an RI, a PMI, and CQI.

In an embodiment, the HARQ-ACK information is corresponding ACK or NACK feedback from the terminal device for a received downlink channel. Therefore, it can be considered that HARQ-ACK information in UCI has the highest priority when the UCI is transmitted on the PUSCH. Therefore, the priority of uplink channel from low to high may include:
an uplink channel without HARQ-ACK; and
an uplink channel with HARQ-ACK.

In an embodiment, in 320, the terminal device transmitting, according to priority of uplink channel, at least one of the first uplink channel and the second uplink channel in the first time unit includes: the terminal device transmits, according to the priority of uplink channel, one of the first uplink channel and the second uplink channel with higher priority in the first time unit.

Or, in an embodiment, in 320, the terminal device transmitting, according to priority of uplink channel, at least one of the first uplink channel and the second uplink channel in the first time unit includes: the terminal device transmits one of the first uplink channel and the second uplink channel with higher priority in the first time unit, and reduces transmitting power to transmit one of the first uplink channel and the second uplink channel with lower priority.

When total transmitting power for transmission of different uplink channels in a first time unit exceeds maximum transmitting power for a terminal device, the terminal device may transmit, according to priority of uplink channel, one of the first uplink channel and the second uplink channel with higher priority in the first time unit. However, in case that there is still remaining power available for transmission of one of the two uplink channels with lower priority, the terminal device may use the remaining power (that is, reduce the transmitting power) to transmit one of the first uplink channel and the second uplink channel with lower priority, thereby transmitting as much uplink data as possible to the network device.

When total transmitting power for transmission of different uplink channels in a first time unit exceeds maximum transmitting power for a terminal device, the terminal device may transmit, according to the priority of uplink channel, one of the first uplink channel and the second uplink channel with higher priority in the first time unit. In case that the maximum transmitting power for the terminal device is insufficient to transmit one of the two uplink channels with higher priority, the terminal device uses the maximum transmitting power to transmit one of the first uplink channel and the second uplink channel with higher priority.

In an embodiment, an uplink channel without HARQ-ACK includes: an uplink channel without HARQ-ACK and without a reference signal, and an uplink channel without HARQ-ACK and with a reference signal. An uplink channel with HARQ-ACK includes: an uplink channel with HARQ-ACK and without a reference signal, and an uplink channel with HARQ-ACK and with a reference signal.

In an embodiment, the reference signal includes a DMRS.

The priority of uplink channel from low to high further includes:
an uplink channel without HARQ-ACK and without a reference signal;
an uplink channel without HARQ-ACK and with a reference signal;
an uplink channel with HARQ-ACK and without a reference signal; and
an uplink channel with HARQ-ACK and with a reference signal.

In an embodiment, since a PUCCH is used for transmitting UCI, and a reference signal is included on the PUCCH or a reference signal is used to transmit the UCI, it is believed that the priority of the PUCCH belongs to priority corresponding to "an uplink channel with HARQ-ACK and with a reference signal" as described above.

In an embodiment, since a PUCCH may be used to transmit one type of or multiple types of uplink control information such as HARQ-ACK, an RI, a PMI, and CQI, etc., where the HARQ-ACK has the highest priority, it is believed that the priority of the PUCCH carrying the HARQ-ACK information belongs to priority corresponding to "an uplink channel with HARQ-ACK and with a reference signal" as described above.

In an embodiment, since a PUCCH may also be used to transmit scheduling request information, it is believed that the priority of the PUCCH belongs to priority corresponding to "an uplink channel with HARQ-ACK and with a reference signal" as described above when the PUCCH carries the scheduling request information.

In an embodiment, an uplink channel without HARQ-ACK and with a reference signal includes: an uplink channel without HARQ-ACK and with a reference signal and not sharing the reference signal, and an uplink channel without HARQ-ACK and with a reference signal and sharing the reference signal.

The priority of uplink channel from low to high further includes:
an uplink channel without HARQ-ACK and without a reference signal;
an uplink channel without HARQ-ACK and with a reference signal and not sharing the reference signal;
an uplink channel with HARQ-ACK and without a reference signal;
an uplink channel without HARQ-ACK and with a reference signal and sharing the reference signal; and
an uplink channel with HARQ-ACK and with a reference signal.

In the embodiment of the present application, the reference signal in the uplink channel sharing the reference signal is used to demodulate an uplink channel in a second time unit, and the uplink channel in the second time unit comprises HARQ-ACK and does not comprise the reference signal. The reference signal in the uplink channel not sharing the reference signal is not used to demodulate the uplink channel in the second time unit.

That is to say, when an uplink channel transmitted in a first time unit is an uplink channel sharing a reference signal, the reference signal in the uplink channel transmitted in the first time unit may be used to demodulate HARQ-ACK carried in an uplink channel in another time unit (that is, a second time unit). When an uplink channel transmitted in a first time unit is an uplink channel not sharing a reference signal, the reference signal in the uplink channel transmitted in the first time unit is not used to demodulate HARQ-ACK carried in an uplink channel in another time unit.

In the embodiment of the present application, in case that a reference signal in an uplink channel transmitted in a first time unit can be used to demodulate an uplink channel in a second time unit, but the uplink channel in the second time unit does not carry HARQ-ACK, then the uplink channel transmitted in the first time unit is also conceived as an uplink channel not sharing a reference signal.

In an embodiment, a length of the second time unit may be 2 symbols or 3 symbols, for example, the second time unit may be the aforementioned sTTI of 2 symbols or 3 symbols. The length of the second time unit may also be other lengths, which is not limited in this application.

It should be understood that an uplink channel without HARQ-ACK and with a reference signal and sharing the reference signal as described in the embodiment of the present application may refer to an uplink channel including uplink data and a reference signal, that is, the first case included in the three cases for the foregoing PUSCH, such as DDR, DR, and RD, etc., described in Table 1; or an uplink channel without HARQ-ACK and with a reference signal and sharing the reference signal may refer to an uplink channel including only a reference signal, that is, the third case included in the three cases for the foregoing PUSCH, such as, the situation described in Table 1, where R of DD|R is transmitted separately in a next sTTI.

It should also be understood that the second time unit may be a time unit before and/or after the first time unit, moreover, the second time unit may be adjacent or non-adjacent to the first time unit.

In particular, the second time unit is one previous time unit adjacent to the first time unit. For example, in case that the first time unit is sTTI n, then the second time unit is sTTI n−1. It should be noted that when an uplink channel with HARQ-ACK and without a reference signal that should be transmitted in the second time unit has been transmitted, the uplink channel carrying the reference signal that is transmitted in the first time unit can be regarded as an uplink channel sharing the reference signal; in case that an uplink channel with HARQ-ACK and without a reference signal that should be transmitted in the second time unit is not transmitted (for example, the transmission is dropped due to priority), the uplink channel carrying the reference signal that is transmitted in the first time unit is an uplink channel not sharing the reference signal.

Therefore, in this embodiment, since the uplink channel without the HARQ-ACK and with the reference signal is divided into two categories, that is, an uplink channel without HARQ-ACK and with a reference signal and sharing the reference signal, and an uplink channel without HARQ-ACK and with a reference signal and not sharing the reference signal, moreover, the priority of uplink channel sharing the reference signal is increased. Therefore, in a case there is no collision with an uplink channel with HARQ-ACK and with a reference signal, even if an uplink channel transmitted in a first time unit does not include HARQ-ACK, but since the uplink channel carries a reference signal and the reference signal is used to demodulate HARQ-ACK that has been transmitted in a second time unit, the uplink channel sharing the reference signal transmitted in the first time unit will also be transmitted normally according to the priority of uplink channel (for example, the same power as that for the uplink channel that has been transmitted in the second time unit is used to transmit the uplink channel in the first time unit), and thus demodulation of the HARQ-ACK that has been transmitted is guaranteed to some extent.

In an embodiment, in 310, the uplink grant information is used to indicate the terminal device to transmit a first uplink channel and a second uplink channel in a first time unit, including: the uplink grant information is used to indicate the terminal device to transmit the first uplink channel in a first time unit on a first carrier and transmits the second uplink channel in a first time unit on a second carrier.

The first carrier is a carrier in a primary PUCCH group configured for the terminal device, and the second carrier is a carrier in a secondary PUCCH group configured for the terminal device.

The priority of uplink channel from low to high further includes:
- an uplink channel without HARQ-ACK on the second carrier;
- an uplink channel without HARQ-ACK on the first carrier;
- an uplink channel with HARQ-ACK on the second carrier; and
- an uplink channel with HARQ-ACK on the first carrier.

Further, in an embodiment, the priority of uplink channel from low to high further includes:
- an uplink channel without HARQ-ACK and without a reference signal on the second carrier;
- an uplink channel without HARQ-ACK and without a reference signal on the first carrier;
- an uplink channel without HARQ-ACK and with a reference signal on the second carrier;
- an uplink channel without HARQ-ACK and with a reference signal on the first carrier;
- an uplink channel with HARQ-ACK and without a reference signal on the second carrier;
- an uplink channel with HARQ-ACK and without a reference signal on the first carrier;
- an uplink channel with HARQ-ACK and with a reference signal on the second carrier; and
- an uplink channel with HARQ-ACK and with a reference signal on the first carrier.

Further, in an embodiment, in consideration of whether the uplink channel shares the reference signal, the priority of uplink channel from low to high further includes:
- an uplink channel without HARQ-ACK and without a reference signal on the second carrier;
- an uplink channel without HARQ-ACK and without a reference signal on the first carrier;
- an uplink channel without HARQ-ACK and with a reference signal and not sharing the reference signal on the second carrier;
- an uplink channel without HARQ-ACK and with a reference signal and not sharing the reference signal on the first carrier;
- an uplink channel with HARQ-ACK and without a reference signal on the second carrier;
- an uplink channel with HARQ-ACK and without a reference signal on the first carrier;

an uplink channel without HARQ-ACK and with a reference signal and sharing the reference signal on the second carrier;

an uplink channel without HARQ-ACK and with a reference signal and sharing the reference signal on the first carrier;

an uplink channel with HARQ-ACK and with a reference signal on the second carrier; and an uplink channel with HARQ-ACK and with a reference signal on the first carrier.

Alternatively, the priority of uplink channel from low to high further includes:

an uplink channel without HARQ-ACK and without a reference signal on the second carrier;

an uplink channel without HARQ-ACK and without a reference signal on the first carrier;

an uplink channel without HARQ-ACK and with a reference signal and not sharing the reference signal on the second carrier;

an uplink channel without HARQ-ACK and with a reference signal and not sharing the reference signal on the first carrier;

an uplink channel with HARQ-ACK and without a reference signal on the second carrier;

an uplink channel with HARQ-ACK and without a reference signal on the first carrier;

an uplink channel without HARQ-ACK and with a reference signal and sharing the reference signal on the second carrier;

an uplink channel with HARQ-ACK and with a reference signal on the second carrier;

an uplink channel without HARQ-ACK and with a reference signal and sharing the reference signal on the first carrier; and an uplink channel with HARQ-ACK and with a reference signal on the first carrier.

Alternatively, the priority of uplink channel from low to high further includes:

an uplink channel without HARQ-ACK and without a reference signal on the second carrier;

an uplink channel without HARQ-ACK and without a reference signal on the first carrier;

an uplink channel without HARQ-ACK and with a reference signal and not sharing the reference signal on the second carrier;

an uplink channel without HARQ-ACK and with a reference signal and not sharing the reference signal on the first carrier;

an uplink channel with HARQ-ACK and without a reference signal on the second carrier;

an uplink channel without HARQ-ACK and with a reference signal and sharing the reference signal on the second carrier;

an uplink channel with HARQ-ACK and with a reference signal on the second carrier;

an uplink channel with HARQ-ACK and without a reference signal on the first carrier;

an uplink channel without HARQ-ACK and with a reference signal and sharing the reference signal on the first carrier; and an uplink channel with HARQ-ACK and with a reference signal on the first carrier.

For example, the priority of uplink channel in the embodiment of the present application is described in conjunction with Table 2 to Table 5. The uplink channel transmission situation shown in Table 2 to Table 5 may be indicated as shown in Table 6 to Table 9, respectively. An uplink channel double-crossed by "—" in Table 6 to Table 9 represents one of the two uplink channels with lower priority, that is, the uplink channel double-crossed by "—" is transmitted in reduced power or is not transmitted.

In this example, the priority of uplink channel from low to high includes:

an uplink channel without HARQ-ACK and without a reference signal on the second carrier;

an uplink channel without HARQ-ACK and without a reference signal on the first carrier;

an uplink channel without HARQ-ACK and with a reference signal and not sharing the reference signal on the second carrier;

an uplink channel without HARQ-ACK and with a reference signal and not sharing the reference signal on the first carrier;

an uplink channel with HARQ-ACK and without a reference signal on the second carrier;

an uplink channel with HARQ-ACK and without a reference signal on the first carrier;

an uplink channel without HARQ-ACK and with a reference signal and sharing the reference signal on the second carrier;

an uplink channel without HARQ-ACK and with a reference signal and sharing the reference signal on the first carrier;

an uplink channel with HARQ-ACK and with a reference signal on the second carrier; and an uplink channel with HARQ-ACK and with a reference signal on the first carrier.

The reference signal in the uplink channel not sharing the reference signal is not used to demodulate an uplink channel with HARQ-ACK and without a reference signal in a second time unit, and the reference signal in the uplink channel sharing the reference signal is used to demodulate an uplink channel in the second time unit, and the uplink channel in the second time unit comprises HARQ-ACK and does not comprise the reference signal.

For Table 6 and Table 7, it is assumed that the second time unit is a time unit located before the first time unit; while for Table 8 and Table 9, it is assumed that the second time unit is a time unit located after the first time unit.

In Table 6, in a non-power-limited case, the terminal device transmits "DR" and "DD with HARQ-ACK" on the carrier in the primary PUCCH group in sTTI n and sTTI n+1 respectively, and the uplink channel in sTTI n+1 is demodulated with a reference signal in sTTI n; the terminal device transmits "DD with HARQ-ACK" and "RD" on the carrier in the secondary PUCCH group in sTTI n and sTTI n+1 respectively, and the uplink channel in sTTI n is demodulated with a reference signal in sTTI n+1.

In a power-limited case, in sTTI n, the priority of "DR" on the carrier in the primary PUCCH group is lower than the priority of "DD with HARQ-ACK" on the carrier in the secondary PUCCH group, therefore, "DR" in sTTI n on the carrier in the primary PUCCH group will be transmitted in reduced power or not be transmitted.

Since the reference signal in "RD" on the carrier in the secondary PUCCH group in sTTI n+1 is used for demodulation of "DD with HARQ-ACK" thereof in sTTI n, therefore, the priority of "RD" on the carrier in the secondary PUCCH group in sTTI n+1 is higher than the priority of "DD with HARQ-ACK" on the carrier in the primary PUCCH group in sTTI n+1, so that "DD with HARQ-ACK" on the carrier in the primary PUCCH group in sTTI n+1 will be transmitted in reduced power or is not transmitted.

TABLE 6

| PUCCH group | sTTI n | sTTI n + 1 |
|---|---|---|
| One carrier in a primary PUCCH group | ~~DR~~ | ~~DD with HARQ-ACK~~ |
| One carrier in a secondary PUCCH group | DD with HARQ-ACK | RD |

In Table 7, in a non-power-limited case, the terminal device transmits "DD with HARQ-ACK" and "RD" on the carrier in the primary PUCCH group in sTTI n and sTTI n+1 respectively, and the uplink channel in sTTI n is demodulated with a reference signal in sTTI n+1; the terminal device transmits "DR" and "DD with HARQ-ACK" on the carrier in the secondary PUCCH group in sTTI n and sTTI n+1 respectively, and the uplink channel in sTTI n+1 is demodulated with a reference signal in sTTI n.

In a power-limited case, in sTTI n, the priority of "DR" on the carrier in the secondary PUCCH group is lower than the priority of "DD with HARQ-ACK" on the carrier in the primary PUCCH group, therefore, "DR" in sTTI n on the carrier in the secondary PUCCH group will be transmitted in reduced power or not be transmitted.

Since the reference signal in "RD" on the carrier in the primary PUCCH group in sTTI n+1 is used for demodulation of "DD with HARQ-ACK" thereof in sTTI n, therefore, the priority of "RD" on the carrier in the primary PUCCH group in sTTI n+1 is higher than the priority of "DD with HARQ-ACK" on the carrier in the secondary PUCCH group in sTTI n+1, so that "DD with HARQ-ACK" on the carrier in the secondary PUCCH group in sTTI n+1 will be transmitted in reduced power or not be transmitted.

TABLE 7

| PUCCH group | sTTI n | sTTI n + 1 |
|---|---|---|
| One carrier in a primary PUCCH group | DD with HARQ-ACK | RD |
| One carrier in a secondary PUCCH group | ~~DR~~ | ~~DD with HARQ-ACK~~ |

In Table 8, in a power-limited case, the reference signal in "DDR" on the carrier in the secondary PUCCH group in sTTI n is used for demodulation of "DD with HARQ-ACK" in sTTI n+2, therefore, its priority is higher than the priority of "DDR" in the primary PUCCH group, so that "DDR" on the carrier in the primary PUCCH group in sTTI n will be transmitted in reduced power or not be transmitted.

Since "DD" on the carrier in the primary PUCCH group in sTTI n+1 needs to be demodulated using the reference signal in sTTI n, the transmitting power of the uplink channel in sTTI n+1 should be in line with the transmitting power of the uplink channel in sTTI n. Therefore, "DD" on the carrier in the primary PUCCH group in sTTI n+1 will be transmitted in reduced power or not be transmitted.

It should be noted here that, in an embodiment, in case that a reference signal in one TTI is also used for demodulation of data in another sTTI, then transmitting power in the two TTIs is usually the same. For example, a reference signal in sTTI n+1 is used to demodulate uplink data in sTTI n, when transmitting power of the uplink channel in sTTI n is reduced, in case that an uplink channel in sTTI n+1 can be normally transmitted, then the uplink channel in sTTI n+1 should be transmitted using the same transmitting power as the uplink channel in sTTI n, thereby ensuring demodulation performance of the uplink channel in sTTI n.

In an embodiment, in case that the uplink channel in sTTI n is transmitted according to normal power, but the uplink channel in sTTI n+1 needs to reduce the transmitting power due to reasons such as power limitation and lower priority of channel, the uplink channel in sTTI n+1 may not be transmitted.

Since "RD" on the carrier in the primary PUCCH group in sTTI n+2 is not used for demodulation of uplink channels in other sTTIs, the priority of "RD" on the carrier in the primary PUCCH group in sTTI n+2 is lower than the priority of "DD with HARQ-ACK" on the carrier in the secondary PUCCH group in sTTI n+2, so that "RD" on the carrier in the primary PUCCH group in sTTI n+2 will be transmitted in reduced power or not be transmitted.

TABLE 8

| PUCCH group | sTTI n | sTTI n + 1 | sTTI n + 2 |
|---|---|---|---|
| One carrier in a primary PUCCH group | ~~DDR~~ | ~~DD~~ | ~~RD~~ |
| One carrier in a secondary PUCCH group | DDR | DD | DD with HARQ-ACK |

In Table 9, in a power-limited case, the reference signal in "DDR" on the carrier in the secondary PUCCH group in sTTI n is used for demodulation of "DD with HARQ-ACK" in sTTI n+1 and sTTI n+2, therefore, its priority is higher than the priority of "DDR" in the primary PUCCH group, so that "DDR" on the carrier in the primary PUCCH group in sTTI n will be transmitted in reduced power or not be transmitted.

Since the priority of "DD" on the carrier in the primary PUCCH group in sTTI n+1 is lower than the priority of "DD with HARQ-ACK" on the carrier in the secondary PUCCH group in sTTI n+1, so that "DD" on the carrier in the primary PUCCH group in sTTI n+1 will be transmitted in reduced power or not be transmitted.

Since "RD" on the carrier in the primary PUCCH group in sTTI n+2 is not used for demodulation of uplink channels in other sTTIs, the priority of "RD" on the carrier in the primary PUCCH group in sTTI n+2 is lower than the priority of "DD with HARQ-ACK" on the carrier in the secondary PUCCH group in sTTI n+2, so that "RD" on the carrier in the primary PUCCH group in sTTI n+2 will be transmitted in reduced power or not be transmitted.

TABLE 9

| PUCCH group | sTTI n | sTTI n + 1 | sTTI n + 2 |
|---|---|---|---|
| One carrier in a primary PUCCH group | ~~DDR~~ | ~~DD~~ | ~~RD~~ |
| One carrier in a secondary PUCCH group | DDR | DD with HARQ-ACK | DD with HARQ-ACK |

In an embodiment, when there are at least two uplink channels overlapped in each of at least two subslot-TTIs in multiple subslot-TTIs included in one subframe or one slot (that is, at least two uplink channels need to transmitted simultaneously), in a power-limited case, transmission in the subframe or the slot is determined according to priority of uplink channel in one of the subslot-TTIs where the overlapping occurs (for example, a first subslot-TTI where there is overlapping).

For example, assuming that a first slot includes three subslot-TTIs: sTTI 0, sTTI 1 and sTTI 2, a terminal device needs to perform, in the three sub slot-TTIs including sTTI 0, sTTI 1 and sTTI 2, uplink channel transmission on a first carrier and a second carrier, respectively, where the first carrier is a carrier in a primary PUCCH group configured for the terminal device, and the second carrier is a carrier in a secondary PUCCH group configured for the terminal device. In a power-limited case, the terminal device determines an uplink channel with higher priority according to the priority of uplink channel in sTTI 0. For example, assuming that the uplink channel on the first carrier in sTTI 0 has higher priority, then for the uplink transmission performed by the terminal device in the first slot, it is assumed that the uplink channel on the first carrier has higher priority.

It should be noted that, on the premise that there is no conflict, various embodiments and/or technical features in various embodiments described in the present application may be combined with each other arbitrarily, and the technical solutions obtained after the combination should also fall into the protection scope of the present application.

It should be understood that, in various embodiments of the present application, sequence numbers of each of the above processes do not mean an execution order, and the execution order of each of processes should be determined by its function and internal logic rather than being intended to limit implementations in the embodiments of the present application.

The communication method according to the embodiment of the present application is described in detail above. Hereinafter, an apparatus according to an embodiment of the present application will be described with reference to FIG. 4 to FIG. 6. The technical features described in the method embodiment are applicable to the following apparatus embodiments.

Figure 4:
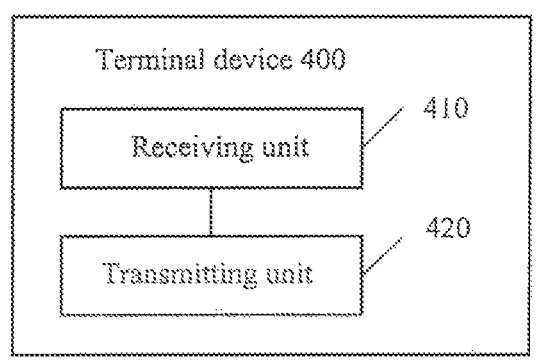
FIG. 4 is a schematic block diagram of a terminal device according to an embodiment of the present application.

FIG. 4 is a schematic block diagram of a terminal device 400 according to an embodiment of the present application. As shown in FIG. 4, the terminal device 400 includes a receiving unit 410 and a transmitting unit 420. Where;

the receiving unit 410 is configured to receive uplink grant information transmitted by a network device, where the uplink grant information is used to indicate the terminal device to transmit a first uplink channel and a second uplink channel in a first time unit;

the transmitting unit 420 is configured to transmit, according to priority of uplink channel, at least one of the first uplink channel and the second uplink channel in the first time unit when total transmitting power for the terminal device to transmit the first uplink channel and the second uplink channel exceeds maximum transmitting power for the terminal device;

where the priority of uplink channel from low to high includes: an uplink channel without hybrid automatic repeat request-acknowledgement HARQ-ACK; and an uplink channel with HARQ-ACK.

Therefore, when total transmitting power for transmission of different uplink channels in a time unit exceeds maximum transmitting power for a terminal device, the terminal device performs, based on priority of uplink channel, uplink channel transmission in the time unit. Since priority of uplink channel without HARQ-ACK is lower than priority of uplink channel with HARQ-ACK, thereby normal transmission of important HARQ-ACK is ensured to be prioritized.

In an embodiment, the priority of uplink channel from low to high further includes: an uplink channel without HARQ-ACK and without a reference signal; an uplink channel without HARQ-ACK and with a reference signal; an uplink channel with HARQ-ACK and without a reference signal; and an uplink channel with HARQ-ACK and with a reference signal.

In an embodiment, the priority of uplink channel from low to high further includes: an uplink channel without HARQ-ACK and without a reference signal; an uplink channel without HARQ-ACK and with a reference signal and not sharing the reference signal, where the reference signal in the uplink channel not sharing the reference signal is not used to demodulate an uplink channel in a second time unit, and the uplink channel in the second time unit comprises HARQ-ACK and does not comprise the reference signal; an uplink channel with HARQ-ACK and without a reference signal; an uplink channel without HARQ-ACK and with a reference signal and sharing the reference signal, where the reference signal in the uplink channel sharing the reference signal is used to demodulate the uplink channel in the second time unit; and an uplink channel with HARQ-ACK and with a reference signal.

In an embodiment, the second time unit is one previous time unit adjacent to the first time unit.

In an embodiment, the uplink grant information is used to indicate the terminal device to transmit a first uplink channel and a second uplink channel in a first time unit, including: the uplink grant information is used to indicate the terminal device to transmit the first uplink channel in a first time unit on a first carrier and transmits the second uplink channel in a first time unit on a second carrier, where the first carrier is a carrier in a primary physical uplink control channel PUCCH group configured for the terminal device, and the second carrier is a carrier in a secondary PUCCH group configured for the terminal device, and where the priority of uplink channel from low to high further includes: an uplink channel without HARQ-ACK on the second carrier; an uplink channel without HARQ-ACK on the first carrier; an uplink channel with HARQ-ACK on the second carrier; and an uplink channel with HARQ-ACK on the first carrier.

In an embodiment, the priority of uplink channel from low to high further includes: an uplink channel without HARQ-ACK and without a reference signal on the second carrier; an uplink channel without HARQ-ACK and without a reference signal on the first carrier; an uplink channel without HARQ-ACK and with a reference signal on the second carrier; an uplink channel without HARQ-ACK and with a reference signal on the first carrier; an uplink channel with HARQ-ACK and without a reference signal on the second carrier; an uplink channel with HARQ-ACK and without a reference signal on the first carrier; an uplink channel with HARQ-ACK and with a reference signal on the second carrier; and an uplink channel with HARQ-ACK and with a reference signal on the first carrier.

In an embodiment, the priority of uplink channel from low to high further includes: an uplink channel without HARQ-ACK and without a reference signal on the second carrier; an uplink channel without HARQ-ACK and without a reference signal on the first carrier; an uplink channel without HARQ-ACK and with a reference signal and not sharing the reference signal on the second carrier, where the reference signal in the uplink channel not sharing the reference signal is not used to demodulate an uplink channel in the second time unit, and the uplink channel in the second time unit comprises HARQ-ACK and does not comprise the reference signal; an uplink channel without HARQ-ACK and with a reference signal and not sharing the reference signal on the first carrier; an uplink channel with HARQ-ACK and without a reference signal on the second carrier; an uplink channel with HARQ-ACK and without a reference signal on the first carrier; an uplink channel without HARQ-ACK and with a reference signal and sharing the reference signal on the second carrier, where the reference signal in the uplink channel sharing the reference signal is used to demodulate the uplink channel in the second time unit; an uplink channel without HARQ-ACK and with a reference signal and sharing the reference signal on the first carrier; an uplink channel with HARQ-ACK and with a reference signal on the second carrier; and an uplink channel with HARQ-ACK and with a reference signal on the first carrier.

In an embodiment, the priority of uplink channel from low to high further includes: an uplink channel without HARQ-ACK and without a reference signal on the second carrier; an uplink channel without HARQ-ACK and without a reference signal on the first carrier; an uplink channel without HARQ-ACK and with a reference signal and not sharing the reference signal on the second carrier, where the reference signal in the uplink channel not sharing the reference signal is not used to demodulate an uplink channel in the second time unit, and the uplink channel in the second time unit comprises HARQ-ACK and does not comprise the reference signal; an uplink channel without HARQ-ACK and with a reference signal and not sharing the reference signal on the first carrier; an uplink channel with HARQ-ACK and without a reference signal on the second carrier; an uplink channel with HARQ-ACK and without a reference signal on the first carrier; an uplink channel without HARQ-ACK and with a reference signal and sharing the reference signal on the second carrier, where the reference signal in the uplink channel sharing the reference signal is used to demodulate the uplink channel in the second time unit; an uplink channel with HARQ-ACK and with a reference signal on the second carrier; an uplink channel without HARQ-ACK and with a reference signal and sharing the reference signal on the first carrier; and an uplink channel with HARQ-ACK and with a reference signal on the first carrier.

In an embodiment, the priority of uplink channel from low to high further includes: an uplink channel without HARQ-ACK and without a reference signal on the second carrier; an uplink channel without HARQ-ACK and without a reference signal on the first carrier; an uplink channel without HARQ-ACK and with a reference signal and not sharing the reference signal on the second carrier, where the reference signal in the uplink channel not sharing the reference signal is not used to demodulate an uplink channel in a second time unit, and the uplink channel in the second time unit comprises HARQ-ACK and does not comprise the reference signal; an uplink channel without HARQ-ACK and with a reference signal and not sharing the reference signal on the first carrier; an uplink channel with HARQ-ACK and without a reference signal on the second carrier; an uplink channel without HARQ-ACK and with a reference signal and sharing the reference signal on the second carrier, where the reference signal in the uplink channel sharing the reference signal is used to demodulate the uplink channel in the second time unit; an uplink channel with HARQ-ACK and with a reference signal on the second carrier; an uplink channel with HARQ-ACK and without a reference signal on the first carrier; an uplink channel without HARQ-ACK and with a reference signal and sharing the reference signal on the first carrier; and an uplink channel with HARQ-ACK and with a reference signal on the first carrier.

In an embodiment, the second time unit is one previous time unit adjacent to the first time unit.

In an embodiment, the transmitting unit 420 is configured to: transmit, according to the priority of uplink channel, one of the first uplink channel and the second uplink channel with higher priority in the first time unit.

In an embodiment, the transmitting unit 420 is configured to: transmit one of the first uplink channel and the second uplink channel with higher priority in the first time unit, and reduce transmitting power to transmit one of the first uplink channel and the second uplink channel with lower priority.

It should be understood that the terminal device 400 may perform corresponding operations performed by the terminal device in the foregoing method 300. For brevity, details will not be described herein again.

Figure 5:
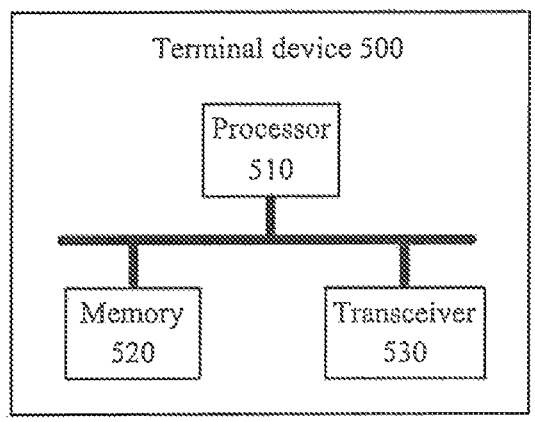
FIG. 5 is a schematic structural diagram of a terminal device according to an embodiment of the present application.

FIG. 5 is a schematic structural diagram of a terminal device 500 according to an embodiment of the present application. As show in FIG. 5, the terminal device includes a processor 510 which may call and run a computer program from a memory to implement corresponding processes implemented by the terminal device in each of the methods according to the embodiment of the present application. For brevity, details will not be described herein again.

In an embodiment, as shown in FIG. 5, the terminal device 500 may further include a memory 520. The processor 510 may call and run a computer program from the memory 520 to implement the method in the embodiment of the present application. The memory 520 may be a separate device independent of the processor 510 or may be integrated in the processor 510.

In an embodiment, as shown in FIG. 5, the terminal device 500 may further include a transceiver 530. The processor 510 may control the transceiver 530 to communicate with other devices, in particular, to transmit information or data to other devices, or receive information or data transmitted by the other devices.

The transceiver 530 may include a transmitter and a receiver. The transceiver 530 may further include an antenna, and the number of antennas may be one or more.

Figure 6:
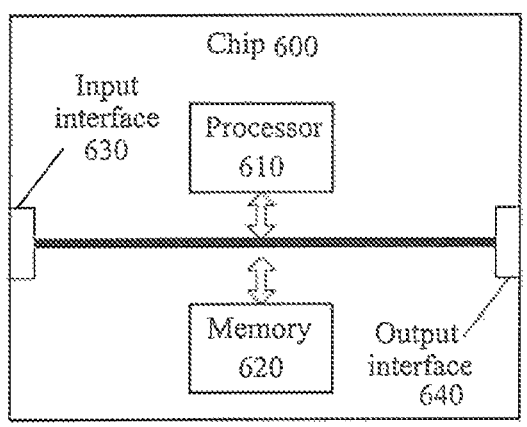
FIG. 6 is a schematic structural diagram of a chip according to an embodiment of the present application.

FIG. 6 is a schematic structural diagram of a chip according to an embodiment of the present application. The chip 600 shown in FIG. 6 includes a processor 610 which may call and run a computer program from a memory to implement the method in the embodiment of the present application.

The memory 620 may be a separate device independent of the processor 610 or may be integrated in the processor 610.

In an embodiment, the chip 600 may further include an input interface 630. The processor 610 may control the input interface 630 to communicate with other devices or chip, in particular, to acquire information or data transmitted by other devices or chip.

In an embodiment, the chip 600 may further include an output interface 640. The processor 610 may control the output interface 640 to communicate with other devices or chip, in particular, to output information or data to other devices or chip.

In an embodiment, the chip can be applied to the terminal device in the embodiment of the present application; moreover, the chip may perform corresponding processes implemented by the terminal device in each of the methods of the embodiment of the present application. For brevity, details will not be described herein again.

It should be understood that the chip mentioned in the embodiment of the present application may also be referred to as a system level chip, a system chip, a chip system or a system-on-chip, and the like.

The processor mentioned above may be a general purpose processor, a digital signal processor (DSP), a field programmable gate array (FPGA), an application specific integrated circuit (ASIC), or other programmable logic device, transistor logic device, or discrete hardware component, and the like. The general purpose processor mentioned above may be a microprocessor or any conventional processor, and the like.

The memory mentioned above may be a volatile memory or a non-volatile memory, or may include both the volatile memory and the non-volatile memory. The non-volatile memory may be a read-only memory (ROM), a programmable ROM (PROM), or an erasable PROM (EPROM), an electrically EPROM (EEPROM) or a flash memory. The volatile memory may be a random access memory (RAM).

It should be understood that the foregoing memory is exemplary but not restrictive illustration. For example, the memory in the embodiment of the present application may also be a static RAM (SRAM), a dynamic RAM (DRAM), a synchronous DRAM (SDRAM), a double data rate SDRAM (DDR SDRAM), an enhanced SDRAM (ES-DRAM), a synch link DRAM (SLDRAM) and a Direct Rambus RAM (DR RAM), and the like. That is to say, the memory in the embodiment of the present application is intended to include, but is not limited to these and any other suitable types of memories.

It should be understood, in the embodiment of the present invention, "B associated with (corresponding to) A" means that B is associated with A, and B can be determined according to A. However, it should also be understood that determining B according to A does not mean that B is determined according to A only, but that B can also be determined according to A and/or other information.

It may be known to persons of ordinary skill in the art that, the units and the algorithm steps of each of examples that are described with reference to the embodiments disclosed herein can be implemented by electronic hardware or a combination of electronic hardware and computer software. The situation whether these functions are performed by hardware or software depends on specific applications and design constraints of the technical solutions. Persons skilled in the art may implement the described functions by using different methods for each specific application, but such implementation should not be regarded as going beyond the scope of the present application.

It may be clearly understood by a person skilled in the art that, for the purpose of convenient and brief description, reference may be made to the corresponding processes in the foregoing method embodiments for detailed working processes of the foregoing systems, apparatuses, and units, and details will not be described herein again.

In several embodiments provided in the present application, it should be understood that the disclosed systems, apparatuses, and methods may be implemented in other manners. For example, the described apparatus embodiments are merely exemplary. For instance, the division of the units is merely a division of logical functions and there may be other divisions during actual implementations. For instance, multiple units or components may be combined or integrated into another system, or some features may be omitted or not performed. In addition, the presented or discussed mutual couplings or direct couplings or communication connections may be an indirect coupling or communication connection through some interfaces, apparatuses or units, and may be in the form of electrical, mechanical, or other forms.

The units described as separate parts may or may not be physically separate, and parts shown as units may or may not be physical units, that is, may be located in one position, or may be distributed on multiple network units. A part or all of the units may be selected according to actual needs to achieve the objectives of the scheme in the embodiments.

In addition, each of the functional units in each of the embodiments of the present application may be integrated into one processing unit, or each of the units may exist alone physically, or two or more units are integrated into one unit.

If implemented in a form of a software functional unit and sold or used as an independent product, the functions may be stored in a computer-readable storage medium. Based on such understanding, the technical solutions of the present application essentially, or the part contributing to the prior art, or a part of the technical solutions may be implemented in a form of a software product. The computer software product is stored in a storage medium, and includes several instructions for enabling a computer device (which may be a personal computer, a server, or a network device, etc.) to perform all or a part of the steps of the methods described in each of the embodiments of the present application. The foregoing storage medium includes: any medium that can store program codes, such as a USB flash disk, a mobile hard disk, a Read-Only Memory (ROM), a Random Access Memory (RAM), a magnetic disk, or an optical disc, etc.

The above descriptions are merely specific embodiments of the present application; however, the protection scope of the present application is not limited thereto. Any modification or replacement that may be readily conceived by persons skilled in the art within the technical scope disclosed in the present application should fall into the protection scope of the present application. Therefore, the protection scope of the present application shall be subject to the claims.

What is claimed is:

1. An uplink channel transmitting method, comprising:
receiving, by a terminal device, uplink grant information transmitted by a network device, wherein the uplink grant information is used to indicate the terminal device to transmit a first uplink channel and a second uplink channel in a first time unit, wherein the first time unit is a short Transmission Time Interval (sTTI); and
transmitting, by the terminal device, according to priority of uplink channel, at least one of the first uplink channel and the second uplink channel in the first time unit in case that total transmitting power for the terminal device to transmit the first uplink channel and the second uplink channel exceeds maximum transmitting power for the terminal device;
wherein the priority of uplink channel from low to high comprises:
an uplink channel without hybrid automatic repeat request-acknowledgement (HARQ-ACK) and without a reference signal;
an uplink channel without HARQ-ACK and with a reference signal and not sharing the reference signal, wherein the reference signal in the uplink channel not sharing the reference signal is not used to demodulate an uplink channel in a second time unit, and the uplink channel in the second time unit comprises HARQ-ACK and does not comprise the reference signal, and wherein the second time unit is one previous time unit adjacent to the first time unit;
an uplink channel with HARQ-ACK and without a reference signal;
an uplink channel without HARQ-ACK and with a reference signal and sharing the reference signal, wherein the reference signal in the uplink channel sharing the reference signal is used to demodulate the uplink channel in the second time unit; and
an uplink channel with HARQ-ACK and with a reference signal.

2. The method according to claim 1, wherein the uplink grant information is used to indicate the terminal device to transmit a first uplink channel and a second uplink channel in a first time unit, comprising:
the uplink grant information is used to indicate the terminal device to transmit the first uplink channel in a first time unit on a first carrier and transmits the second uplink channel in a first time unit on a second carrier, wherein the first carrier is a carrier in a primary physical uplink control channel (PUCCH) group configured for the terminal device, and the second carrier is a carrier in a secondary PUCCH group configured for the terminal device, and where the priority of uplink channel from low to high further comprises:
an uplink channel without HARQ-ACK on the second carrier;
an uplink channel without HARQ-ACK on the first carrier;
an uplink channel with HARQ-ACK on the second carrier; and
an uplink channel with HARQ-ACK on the first carrier.

3. The method according to claim 2, wherein the priority of uplink channel from low to high further comprises:
an uplink channel without HARQ-ACK and without a reference signal on the second carrier;
an uplink channel without HARQ-ACK and without a reference signal on the first carrier;
an uplink channel without HARQ-ACK and with a reference signal on the second carrier;
an uplink channel without HARQ-ACK and with a reference signal on the first carrier;
an uplink channel with HARQ-ACK and without a reference signal on the second carrier;
an uplink channel with HARQ-ACK and without a reference signal on the first carrier;
an uplink channel with HARQ-ACK and with a reference signal on the second carrier; and
an uplink channel with HARQ-ACK and with a reference signal on the first carrier.

4. The method according to claim 3, wherein the priority of uplink channel from low to high further comprises:
the uplink channel without HARQ-ACK and without the reference signal on the second carrier;
the uplink channel without HARQ-ACK and without the reference signal on the first carrier;
an uplink channel without HARQ-ACK and with the reference signal and not sharing the reference signal on the second carrier, wherein the reference signal in the uplink channel not sharing the reference signal is not used to demodulate an uplink channel in a second time unit, and the uplink channel in the second time unit comprises HARQ-ACK and does not comprise the reference signal;
an uplink channel without HARQ-ACK and with the reference signal and not sharing the reference signal on the first carrier;
the uplink channel with HARQ-ACK and without the reference signal on the second carrier;
the uplink channel with HARQ-ACK and without the reference signal on the first carrier;
an uplink channel without HARQ-ACK and with the reference signal and sharing the reference signal on the second carrier, wherein the reference signal in the uplink channel sharing the reference signal is used to demodulate the uplink channel in the second time unit;
an uplink channel without HARQ-ACK and with the reference signal and sharing the reference signal on the first carrier;
the uplink channel with HARQ-ACK and with the reference signal on the second carrier; and
the uplink channel with HARQ-ACK and with the reference signal on the first carrier.

5. The method according to claim 3, wherein the priority of uplink channel from low to high further comprises:
the uplink channel without HARQ-ACK and without the reference signal on the second carrier;
the uplink channel without HARQ-ACK and without the reference signal on the first carrier;
an uplink channel without HARQ-ACK and with the reference signal and not sharing the reference signal on the second carrier, wherein the reference signal in the uplink channel not sharing the reference signal is not used to demodulate an uplink channel in a second time unit, and the uplink channel in the second time unit comprises HARQ-ACK and does not comprise the reference signal;
an uplink channel without HARQ-ACK and with the reference signal and not sharing the reference signal on the first carrier;
the uplink channel with HARQ-ACK and without the reference signal on the second carrier;
the uplink channel with HARQ-ACK and without the reference signal on the first carrier;
an uplink channel without HARQ-ACK and with the reference signal and sharing the reference signal on the second carrier, wherein the reference signal in the uplink channel sharing the reference signal is used to demodulate the uplink channel in the second time unit;
the uplink channel with HARQ-ACK and with the reference signal on the second carrier;
an uplink channel without HARQ-ACK and with the reference signal and sharing the reference signal on the first carrier; and
the uplink channel with HARQ-ACK and with the reference signal on the first carrier.

6. The method according to claim 3, wherein the priority of uplink channel from low to high further comprises:
the uplink channel without HARQ-ACK and without the reference signal on the second carrier;
the uplink channel without HARQ-ACK and without the reference signal on the first carrier;
an uplink channel without HARQ-ACK and with the reference signal and not sharing the reference signal on the second carrier, wherein the reference signal in the uplink channel not sharing the reference signal is not used to demodulate an uplink channel in a second time unit, and the uplink channel in the second time unit comprises HARQ-ACK and does not comprise the reference signal;
an uplink channel without HARQ-ACK and with the reference signal and not sharing the reference signal on the first carrier;
the uplink channel with HARQ-ACK and without the reference signal on the second carrier;
an uplink channel without HARQ-ACK and with the reference signal and sharing the reference signal on the second carrier, wherein the reference signal in the uplink channel sharing the reference signal is used to demodulate the uplink channel in the second time unit;
the uplink channel with HARQ-ACK and with the reference signal on the second carrier;

the uplink channel with HARQ-ACK and without the reference signal on the first carrier;

an uplink channel without HARQ-ACK and with the reference signal and sharing the reference signal on the first carrier; and the uplink channel with HARQ-ACK and with the reference signal on the first carrier.

7. The method according to claim 1, wherein the transmitting, by the terminal device, according to priority of uplink channel, at least one of the first uplink channel and the second uplink channel in the first time unit comprises:

transmitting, by the terminal device, according to the priority of uplink channel, one of the first uplink channel and the second uplink channel with higher priority in the first time unit.

8. A terminal device, comprising a processor, a transceiver and a memory storing instructions thereon, the processor when executing the instructions, being configured:

control the transceiver to receive uplink grant information transmitted by a network device, wherein the uplink grant information is used to indicate the terminal device to transmit a first uplink channel and a second uplink channel in a first time unit, wherein the first time unit is a short Transmission Time Interval (sTTI); and control the transceiver to transmit, according to priority of uplink channel, at least one of the first uplink channel and the second uplink channel in the first time unit when total transmitting power for the terminal device to transmit the first uplink channel and the second uplink channel exceeds maximum transmitting power for the terminal device;

wherein the priority of uplink channel from low to high comprises:

an uplink channel without hybrid automatic repeat request-acknowledgement (HARQ-ACK) and without a reference signal;

an uplink channel without HARQ-ACK and with a reference signal and not sharing the reference signal, wherein the reference signal in the uplink channel not sharing the reference signal is not used to demodulate an uplink channel in a second time unit, and the uplink channel in the second time unit comprises HARQ-ACK and does not comprise the reference signal, and wherein the second time unit is one previous time unit adjacent to the first time unit;

an uplink channel with HARQ-ACK and without a reference signal;

an uplink channel without HARQ-ACK and with a reference signal and sharing the reference signal, wherein the reference signal in the uplink channel sharing the reference signal is used to demodulate the uplink channel in the second time unit; and an uplink channel with HARQ-ACK and with a reference signal.

9. The terminal device according to claim 8, wherein the uplink grant information is used to indicate the terminal device to transmit a first uplink channel and a second uplink channel in a first time unit, comprising:

the uplink grant information is used to indicate the terminal device to transmit the first uplink channel in a first time unit on a first carrier and transmits the second uplink channel in a first time unit on a second carrier, wherein the first carrier is a carrier in a primary physical uplink control channel (PUCCH) group configured for the terminal device, and the second carrier is a carrier in a secondary PUCCH group configured for the terminal device, and where the priority of uplink channel from low to high further comprises:

an uplink channel without HARQ-ACK on the second carrier;

an uplink channel without HARQ-ACK on the first carrier;

an uplink channel with HARQ-ACK on the second carrier; and an uplink channel with HARQ-ACK on the first carrier.

10. The terminal device according to claim 9, wherein the priority of uplink channel from low to high further comprises:

an uplink channel without HARQ-ACK and without a reference signal on the second carrier;

an uplink channel without HARQ-ACK and without a reference signal on the first carrier;

an uplink channel without HARQ-ACK and with a reference signal on the second carrier;

an uplink channel without HARQ-ACK and with a reference signal on the first carrier;

an uplink channel with HARQ-ACK and without a reference signal on the second carrier;

an uplink channel with HARQ-ACK and without a reference signal on the first carrier;

an uplink channel with HARQ-ACK and with a reference signal on the second carrier; and an uplink channel with HARQ-ACK and with a reference signal on the first carrier.

11. The terminal device according to claim 10, wherein the priority of uplink channel from low to high further comprises:

the uplink channel without HARQ-ACK and without the reference signal on the second carrier;

the uplink channel without HARQ-ACK and without the reference signal on the first carrier;

an uplink channel without HARQ-ACK and with the reference signal and not sharing the reference signal on the second carrier, wherein the reference signal in the uplink channel not sharing the reference signal is not used to demodulate an uplink channel in a second time unit, and the uplink channel in the second time unit comprises HARQ-ACK and does not comprise the reference signal;

an uplink channel without HARQ-ACK and with the reference signal and not sharing the reference signal on the first carrier;

the uplink channel with HARQ-ACK and without the reference signal on the second carrier;

the uplink channel with HARQ-ACK and without the reference signal on the first carrier;

an uplink channel without HARQ-ACK and with the reference signal and sharing the reference signal on the second carrier, wherein the reference signal in the uplink channel sharing the reference signal is used to demodulate the uplink channel in the second time unit;

an uplink channel without HARQ-ACK and with the reference signal and sharing the reference signal on the first carrier;

the uplink channel with HARQ-ACK and with the reference signal on the second carrier; and the uplink channel with HARQ-ACK and with the reference signal on the first carrier.

12. The terminal device according to claim 10, wherein the priority of uplink channel from low to high further comprises:

the uplink channel without HARQ-ACK and without the reference signal on the second carrier;

the uplink channel without HARQ-ACK and without the reference signal on the first carrier;

an uplink channel without HARQ-ACK and with the reference signal and not sharing the reference signal on the second carrier, wherein the reference signal in the uplink channel not sharing the reference signal is not used to demodulate an uplink channel in a second time unit, and the uplink channel in the second time unit comprises HARQ-ACK and does not comprise the reference signal;

an uplink channel without HARQ-ACK and with the reference signal and not sharing the reference signal on the first carrier;

the uplink channel with HARQ-ACK and without the reference signal on the second carrier;

the uplink channel with HARQ-ACK and without the reference signal on the first carrier;

an uplink channel without HARQ-ACK and with the reference signal and sharing the reference signal on the second carrier, wherein the reference signal in the uplink channel sharing the reference signal is used to demodulate the uplink channel in the second time unit;

the uplink channel with HARQ-ACK and with the reference signal on the second carrier;

an uplink channel without HARQ-ACK and with the reference signal and sharing the reference signal on the first carrier; and the uplink channel with HARQ-ACK and with the reference signal on the first carrier.

13. The terminal device according to claim 10, wherein the priority of uplink channel from low to high further comprises:

the uplink channel without HARQ-ACK and without the reference signal on the second carrier;

the uplink channel without HARQ-ACK and without the reference signal on the first carrier;

an uplink channel without HARQ-ACK and with the reference signal and not sharing the reference signal on the second carrier, wherein the reference signal in the uplink channel not sharing the reference signal is not used to demodulate an uplink channel in a second time unit, and the uplink channel in the second time unit comprises HARQ-ACK and does not comprise the reference signal;

an uplink channel without HARQ-ACK and with the reference signal and not sharing the reference signal on the first carrier;

the uplink channel with HARQ-ACK and without the reference signal on the second carrier;

an uplink channel without HARQ-ACK and with the reference signal and sharing the reference signal on the second carrier, wherein the reference signal in the uplink channel sharing the reference signal is used to demodulate the uplink channel in the second time unit;

the uplink channel with HARQ-ACK and with the reference signal on the second carrier;

the uplink channel with HARQ-ACK and without the reference signal on the first carrier;

an uplink channel without HARQ-ACK and with the reference signal and sharing the reference signal on the first carrier; and the uplink channel with HARQ-ACK and with the reference signal on the first carrier.

14. The terminal device according to claim 8, wherein the processor is further configured to control the transceiver to:

transmit one of the first uplink channel and the second uplink channel with higher priority in the first time unit, and reduce transmitting power to transmit one of the first uplink channel and the second uplink channel with lower priority.

* * * * *